US007574865B2

(12) United States Patent
Bland

(10) Patent No.: US 7,574,865 B2
(45) Date of Patent: Aug. 18, 2009

(54) COMBUSTOR FLOW SLEEVE WITH OPTIMIZED COOLING AND AIRFLOW DISTRIBUTION

(75) Inventor: Robert J. Bland, Oviedo, FL (US)

(73) Assignee: Siemens Energy, Inc., Orlando, FL (US)

( * ) Notice: Subject to any disclaimer, the term of this patent is extended or adjusted under 35 U.S.C. 154(b) by 480 days.

(21) Appl. No.: 10/992,184

(22) Filed: Nov. 18, 2004

(65) Prior Publication Data

US 2006/0101801 A1 May 18, 2006

(51) Int. Cl.
*F02C 1/00* (2006.01)
*F02G 3/00* (2006.01)

(52) U.S. Cl. .......................................... 60/752; 60/760

(58) Field of Classification Search ........... 60/752–760, 60/804, 39.23
See application file for complete search history.

(56) References Cited

U.S. PATENT DOCUMENTS

| | | | | | |
|---|---|---|---|---|---|
| 2,627,721 | A | | 2/1953 | Rosenlund | |
| 2,951,339 | A | | 9/1960 | Benson | |
| 3,169,367 | A | * | 2/1965 | Hussey | 60/39.37 |
| 3,652,181 | A | | 3/1972 | Wilhelm, Jr. | |
| 4,058,977 | A | | 11/1977 | Markowski et al. | |
| 4,292,801 | A | | 10/1981 | Wilkes et al. | |
| 4,586,328 | A | | 5/1986 | Howald | |
| 4,719,748 | A | * | 1/1988 | Davis et al. | 60/39.37 |
| 4,872,312 | A | * | 10/1989 | Iizuka et al. | 60/760 |
| 4,944,149 | A | * | 7/1990 | Kuwata | 60/39.23 |
| 4,984,429 | A | | 1/1991 | Waslo et al. | |
| 5,083,422 | A | * | 1/1992 | Vogt | 60/782 |
| 5,226,278 | A | * | 7/1993 | Meylan et al. | 60/755 |
| 5,253,478 | A | * | 10/1993 | Thibault et al. | 60/733 |
| 5,274,991 | A | | 1/1994 | Fitts | |
| 5,572,862 | A | | 11/1996 | Mowill | |
| 5,687,572 | A | * | 11/1997 | Schrantz et al. | 60/753 |
| 5,784,876 | A | * | 7/1998 | Alkabie | 60/776 |
| 6,164,075 | A | * | 12/2000 | Igarashi et al. | 60/752 |
| 6,216,442 | B1 | * | 4/2001 | Belsom et al. | 60/797 |
| 6,331,110 | B1 | * | 12/2001 | Steber et al. | 431/352 |
| 6,412,268 | B1 | | 7/2002 | Cromer et al. | |
| 6,430,932 | B1 | * | 8/2002 | Martling et al. | 60/760 |
| 6,494,044 | B1 | * | 12/2002 | Bland | 60/772 |
| 6,546,730 | B2 | * | 4/2003 | Johnson et al. | 60/752 |
| 6,681,578 | B1 | * | 1/2004 | Bunker | 60/772 |
| 6,810,673 | B2 | * | 11/2004 | Snyder | 60/752 |
| 7,010,921 | B2 | * | 3/2006 | Intile et al. | 60/752 |
| 7,047,723 | B2 | * | 5/2006 | Martling et al. | 60/39.37 |
| 7,089,741 | B2 | * | 8/2006 | Ikeda et al. | 60/725 |
| 7,093,440 | B2 | * | 8/2006 | Howell et al. | 60/752 |
| 7,104,067 | B2 | * | 9/2006 | Bunker | 60/752 |
| 7,146,815 | B2 | * | 12/2006 | Burd | 60/752 |
| 2002/0005037 | A1 | * | 1/2002 | Tegel et al. | 60/39.02 |

(Continued)

*Primary Examiner*—William H Rodríguez

(57) ABSTRACT

Embodiments of the invention relate to a combustor flow sleeve for a turbine engine. The flow sleeve can be configured to optimize cooling and airflow distribution. The flow sleeve can include first and second sets of openings. A first set of openings can be provided for impingement cooling the areas of the liner that are subjected to high thermal loads. The second set of openings can be provided to more evenly distribute the airflow into the combustor head-end. By focusing the cooling on the areas of need and by making the airflow more uniform, embodiments of the invention can reduce the system pressure drop and enhance the performance and power of the engine.

21 Claims, 5 Drawing Sheets

U.S. PATENT DOCUMENTS

| | | | | |
|---|---|---|---|---|
| 2002/0083711 | A1 * | 7/2002 | Dean et al. | 60/737 |
| 2002/0100281 | A1 * | 8/2002 | Hellat et al. | 60/725 |
| 2002/0108375 | A1 * | 8/2002 | Johnson et al. | 60/772 |
| 2002/0152740 | A1 | 10/2002 | Suenaga et al. | |
| 2002/0152751 | A1 * | 10/2002 | Mandai et al. | 60/746 |
| 2002/0157401 | A1 * | 10/2002 | Stuttaford | 60/804 |
| 2004/0079082 | A1 * | 4/2004 | Bunker | 60/752 |
| 2005/0268613 | A1 * | 12/2005 | Intile et al. | 60/772 |
| 2006/0283189 | A1 * | 12/2006 | Lipinski et al. | 60/772 |
| 2007/0113558 | A1 * | 5/2007 | Brown et al. | 60/752 |
| 2007/0130955 | A1 * | 6/2007 | Vandale et al. | 60/776 |
| 2007/0130958 | A1 * | 6/2007 | Ohri et al. | 60/796 |

* cited by examiner

COMBUSTOR FLOW SLEEVE WITH OPTIMIZED COOLING AND AIRFLOW DISTRIBUTION

FIELD OF THE INVENTION

The invention relates in general to turbines engines and, more specifically, to combustor flow sleeves for turbine engines.

BACKGROUND OF THE INVENTION

FIG. 1 shows one known combustor system 10 of a turbine engine. The combustor 10 includes a head-end 12, a transition 14, and a liner 16 extending therebetween. The term "combustor head-end" generally refers to the fuel injection/fuel-air premixing portion of the combustor 10. The specific components and geometry in the area of the head-end 12 can vary from combustor to combustor. The liner 16 extends from the combustor head-end 12 and toward the transition 14. The liner 16 can connect between the combustor head-end 12 and the transition 14 in any of a number of ways, as is known in the art.

The liner 16 requires cooling because of the high temperatures of the combustion occurring inside of the liner. At least a portion of the liner can be cooled by air. One known scheme for air-cooling the liner 16 includes providing a flow sleeve 18 to duct air over the hot sections of the liner 16. In one current engine design, a flow sleeve 18 is secured at one end to the head-end 12 of the combustor 10, such as the combustor casing 20. A substantially annular passage 22 can be formed between the flow sleeve 18 and the combustor liner 16, which can be substantially concentric with each other. Air 26 from the compressor section (not shown) can enter the combustor head-end 12 through the annular passage 22.

As the air travels through the passage 22, it is directed along the surface of the combustor liner 12 to provide cooling. However, in some instances, such as when a combustor has long flames, only a relatively small portion of the liner 12 needs to be cooled. Thus, a substantial portion of the air 26 is being used to cool portions of the liner 12 that are not in need of cooling. One consequence of such unnecessary cooling is an increase in system pressure drop, which in turn lowers the efficiency and power of the turbine.

Experience has revealed another problem presented by existing flow sleeves 16. In particular, the use of a flow sleeve 18 tends to increase the non-uniformity of the air flow into the combustor head-end 12. For one engine, it was discovered that the air flow into the head-end 12 is heavily skewed to the outboard radial side (with respect to the direction of the flow through the flow sleeve) whereas other areas experienced little or no flow. These uneven flow distributions can diminish the cooling effectiveness of the flow. In addition, such flow imbalances can lead to a decrease in combustor performance including the production of undesired nitrides of oxygen (NOx).

Thus, there is a need for a flow sleeve that can adequately cool the combustor liner while minimizing the system pressure drop, provide more uniform flow into the combustor, and minimize losses in engine efficiency and power.

SUMMARY OF THE INVENTION

Embodiments of the invention relate to a combustor for a turbine engine. The combustor includes a combustor head-end, a liner and a flow sleeve. The liner extends from the head-end. The flow sleeve has an axial upstream end and an axial downstream end. The downstream end of the flow sleeve is secured to the combustor head-end. At least a portion of the liner extends into the flow sleeve such that a substantially annular flow passage to the head-end is defined between the outer periphery of the liner and the inner periphery of the flow sleeve.

A plurality of openings are provided about the flow sleeve in a region defined between the axial downstream end of the sleeve and an axially central location of the flow sleeve inclusive. In one embodiment, the plurality of openings can be located in an axially central region of the flow sleeve. The plurality of opening can help to make an uneven distribution of the flow into the head-end through the passage substantially uniform.

Each of the plurality of openings can be substantially circular. Alternatively, one or more of the plurality of openings can be substantially non-circular. At least one of the plurality of openings can be larger than the other openings. Further, the plurality of openings can be substantially identical. The plurality of openings can be arranged in at least one row about the periphery of the flow sleeve.

In some instances, embodiments of the invention can include a plurality of impingement cooling openings provided about the flow sleeve in a region defined between the axial upstream end and an axially central location of the flow sleeve. In one embodiment, the plurality of impingement cooling openings can be located near the axial upstream end of the flow sleeve. Air flowing through the plurality of impingement cooling openings can provide impingement cooling to those portions of the liner directly beneath the openings.

Each of the impingement cooling openings can be substantially circular. The impingement cooling openings can be arranged in at least one row about the periphery of the flow sleeve. In one embodiment, the head-end can further include a pilot nozzle and a flame extending therefrom. The flame can extend inside of the liner to a flame end. The plurality of impingement cooling openings can be radially superimposed along the axial length of the flow sleeve so as to substantially correspond with the flame end. Further, the plurality of openings can be larger than each of the plurality of impingement cooling openings.

The flow passage can be substantially restricted upstream of the other openings such that cross-flow between the air flowing into the plurality of impingement cooling openings and the air that enters the passage through the upstream end of the flow sleeve is minimized. There are a variety of ways that the flow passage can substantially restricted including by a plate, sealing material, piston rings, sprung cloth seals and spring seals.

DETAILED DESCRIPTION OF EMBODIMENTS OF THE INVENTION

Figure 1:
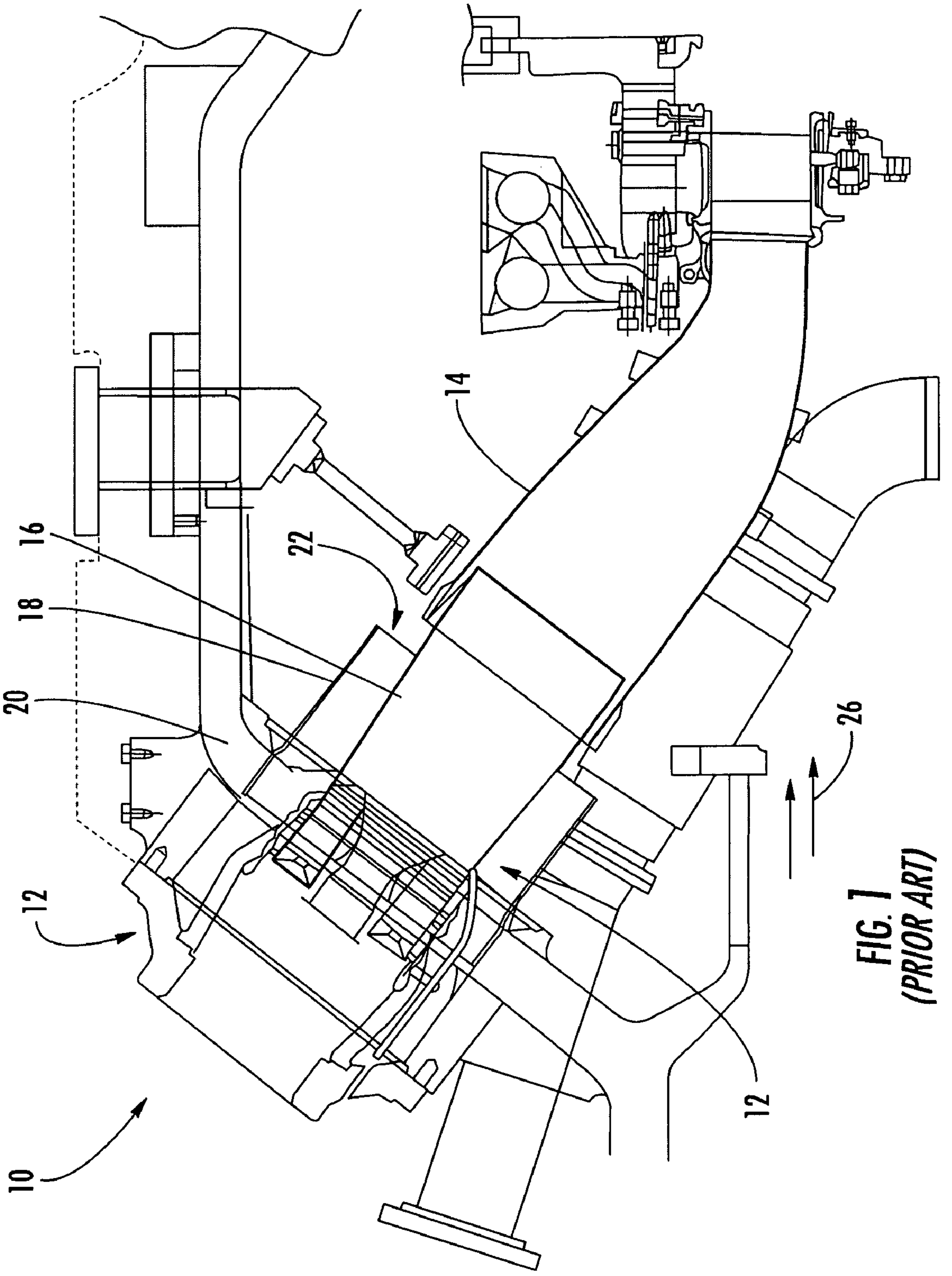
FIG. 1 (PRIOR ART)
FIG. 1 is a cross-sectional view of a portion of the combustor section of a turbine engine having a prior flow sleeve.
Figure 2:
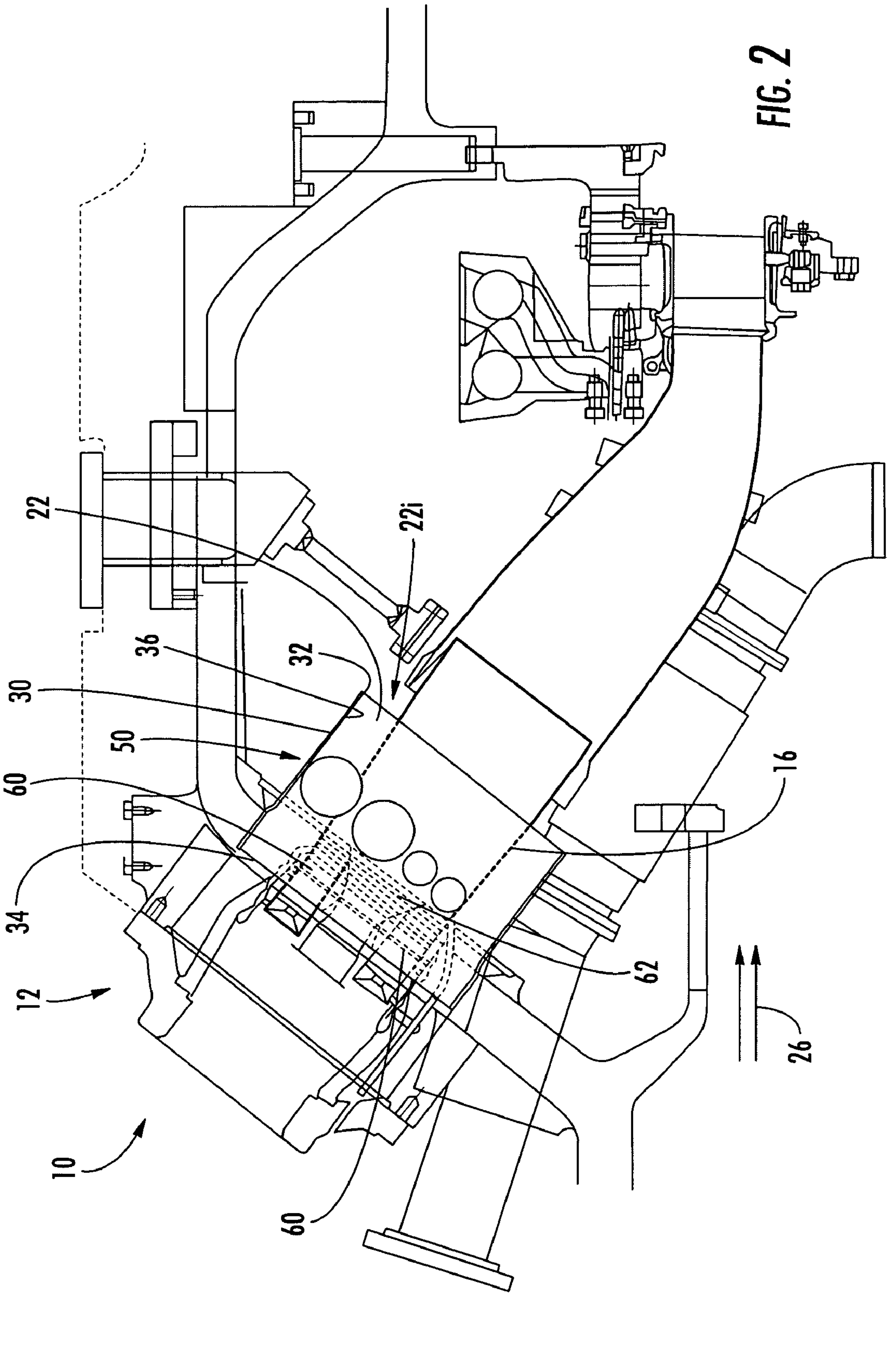
FIG. 2 is a partial cross-sectional view of a portion of a combustor section of a turbine engine having a first flow sleeve according to embodiments of the invention.

Embodiments of the present invention address the uneven flow distribution and unnecessary cooling associated with prior combustor flow sleeves. According to embodiments of the invention, a combustor flow sleeve can be configured to provide more targeted cooling while making the flow into the combustor head-end more uniform. Embodiments of the invention will be explained in the context of one possible system, but the detailed description is intended only as exemplary. Embodiments of the invention are shown in FIGS. 2-5, but the present invention is not limited to the illustrated structure or application.

As mentioned earlier, various flow sleeves are known in the art, and embodiments of the invention are not limited to any specific flow sleeve. A flow sleeve 30 can be generally tubular having an axial upstream end 32 and an axial downstream end 34. The terms "upstream" and "downstream" are used to refer to the ends of the flow sleeve 30 relative to the direction of airflow through the passage 22 defined between the flow sleeve 30 and the liner 16. The flow sleeve 30 can be substantially straight, or it can include one or more tapers, flares, curves or bends. The flow sleeve 30 can be a single piece, or it can be made from two or more components. The inner passage 36 of the flow sleeve 30 can be substantially circular, but other conformations are possible.

The downstream end 34 of the flow sleeve 30 can be attached to the combustor head-end 12. Again, the specific components and geometry in the area of the head-end 12 can vary from combustor to combustor, and embodiments of the invention are not intended to be limited to any specific head-end combustor system nor to any specific components in the head-end 12. As used herein, the combustor head-end can include the combustor outer casing 20 in that region.

In one embodiment, the flow sleeve 30 can be connected to the combustor head-end by fasteners. Accordingly, the downstream end 34 of the flow sleeve 30 can be adapted as needed to facilitate such attachment. The flow sleeve 30 can extend cantilevered therefrom to the upstream end 32. The flow sleeve 30 can include one or more stiffening structures, such as ribs, to structurally reinforce the sleeve 30 and to ensure that the natural frequency of the flow sleeve 30 is sufficiently high so that it does not vibrate loose from its attachment to the head-end 12.

The airflow and cooling drawbacks associated with prior flow sleeves can be minimized by providing openings at strategic locations on the flow sleeve. For example, a first set of openings 40 (FIG. 4) can be provided in the flow sleeve 30 near the axial upstream end 32. The first set of openings 40 can be provided in the flow sleeve 30 by various machining processes including, for example, laser jet cutting, water jet cutting and punching.

The first set of openings 40 can be any size, shape, and quantity; these attributes can be optimized for each application. In one embodiment, the openings 40 can be substantially circular, but other geometries are possible. For example, the openings 40 can be slots (see FIG. 5). In one embodiment, the openings 40 in the first set can be substantially identical to each other, but it is also possible for one or more openings 40 to be different from the other openings 40 in any of a number of respects.

The first set of openings 40 can be provided about the entire periphery 42 of the flow sleeve 30. In some instances, the openings 40 may only be provided in certain portions about the periphery of the flow sleeve 30. For example, the first set of openings 40 may only extend over only about half of the periphery 42 of the flow sleeve 30. Preferably, the openings 40 are substantially peripherally aligned in a row about the flow sleeve 30, but one or more openings 40 can be offset from the other openings 40. The openings 40 can be provided according to a pattern or to no particular pattern. Further, the openings 40 can be spaced at regular or irregular intervals. In one embodiment, the openings 40 can be spaced substantially equidistant from each other about the periphery 42 of the flow sleeve 30.

Figure 4:
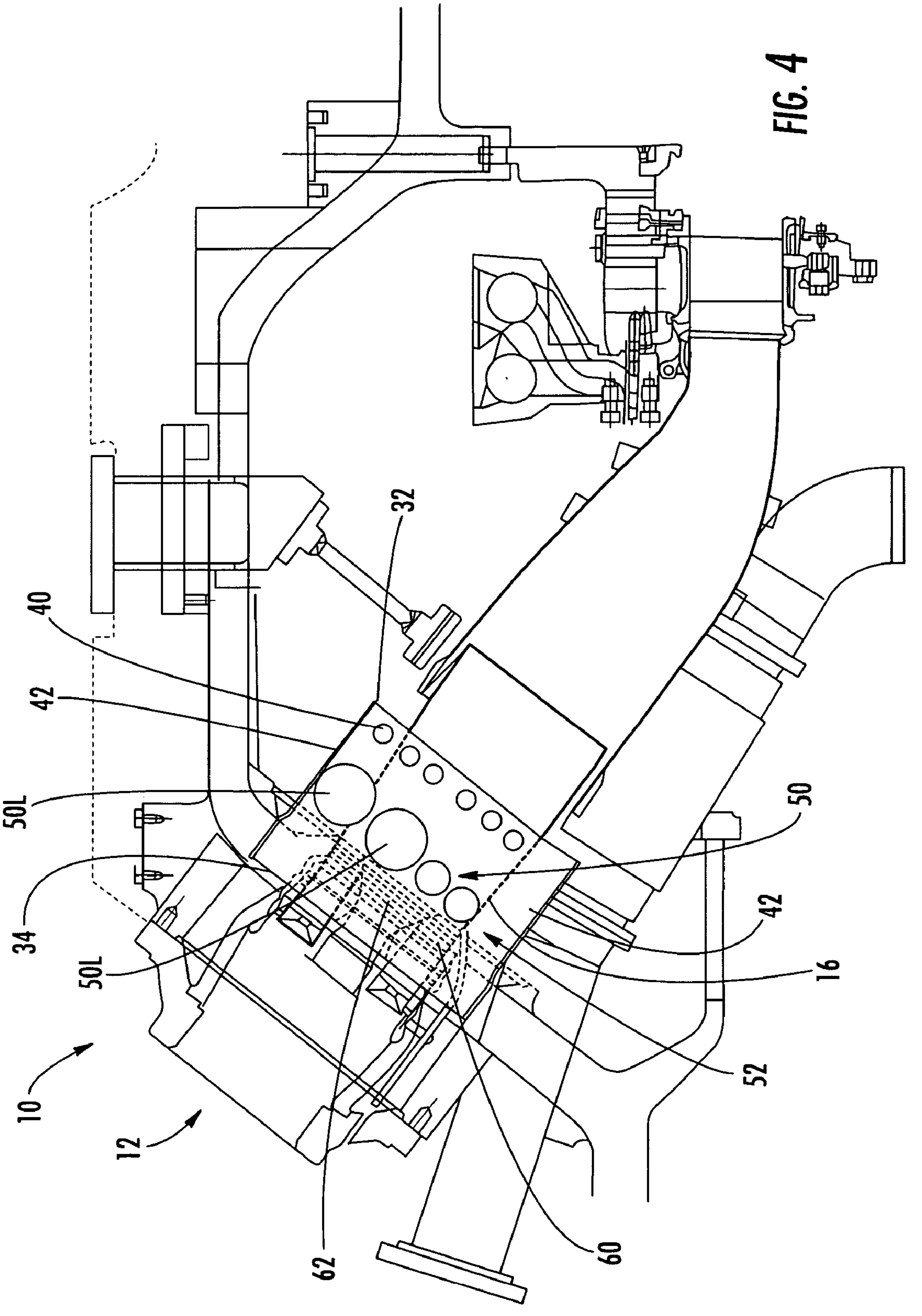
FIG. 4 is a partial cross-sectional view of a portion of a combustor section of a turbine engine having a second flow sleeve according to embodiments of the invention.
Figure 5:
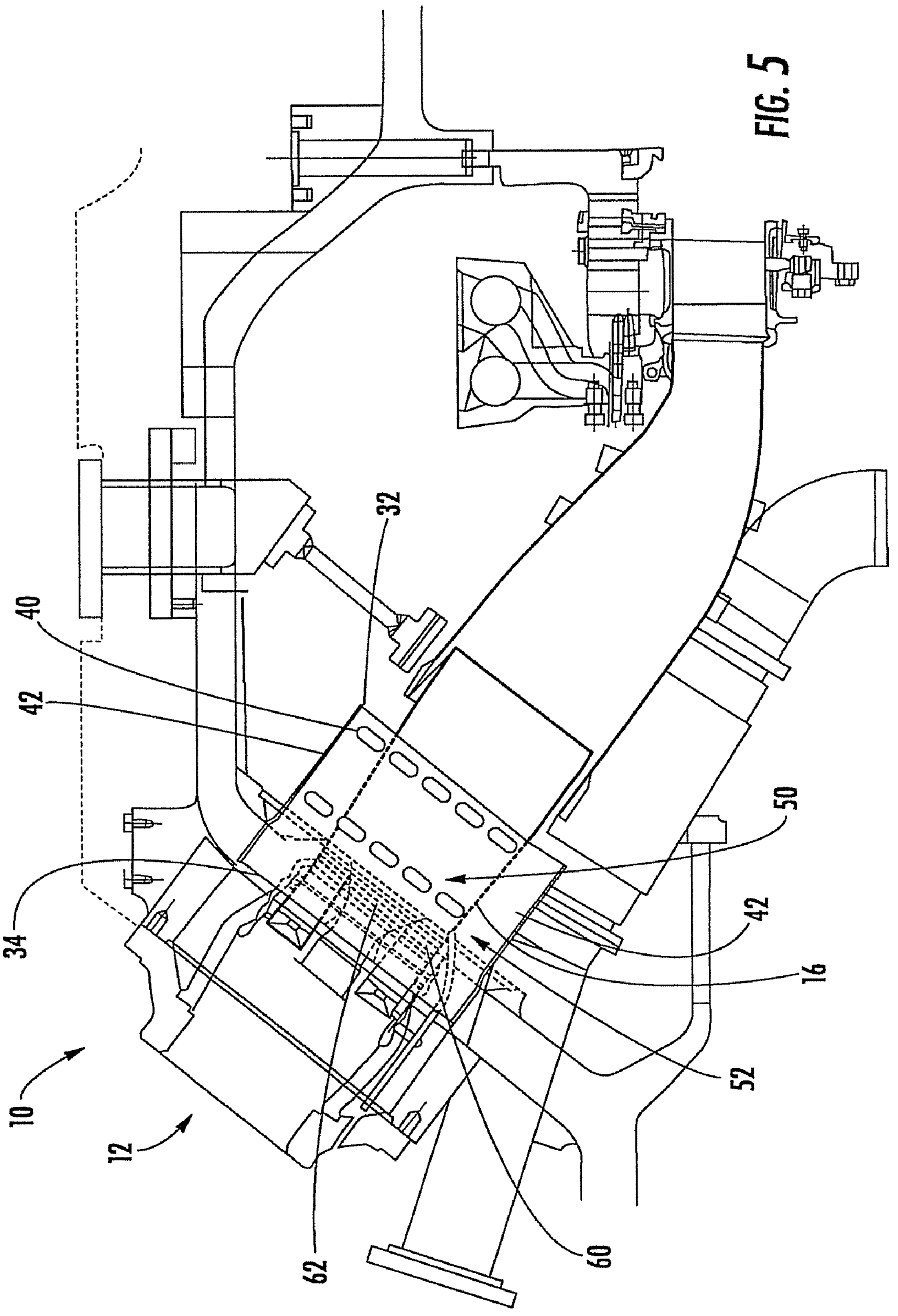
FIG. 5 is a partial cross-sectional view of a portion of a combustor section of a turbine engine having a flow sleeve according to embodiments of the invention, showing a first plurality of non-circular openings and a second plurality of non-circular openings in the flow sleeve.

The first set of openings 40 can be provided in a single row, as shown in FIG. 4, or there can be multiple rows of openings, depending on the application at hand. In the case of multiple rows, one row of openings 40 can be substantially identical to the other row, or the two rows can be different in terms of their size, shape, spacing, area of coverage, quantity and alignment of openings. In one embodiment, substantially constant spacing can be maintained between the rows of openings 40 about the periphery 42 of the flow sleeve 30.

A second set of openings 50 can be provided further downstream of the first set of openings 40. In general, the second set of openings 50 can be provided on the flow sleeve 30 between the axial downstream end 34 of the sleeve 30 and an axially central region 52 of the sleeve 30. In one embodiment, the second set of openings 50 can be provided in the axially central region 52 of the flow sleeve 30 as shown in FIGS. 2-5. Like the first set of openings 40, the second set of openings 50 can be provided in the flow sleeve 30 by various machining processes including, for example, laser jet cutting, water jet cutting and punching. The above discussion of the first set of openings 40 (size, shape, spacing, quantity, number of rows, alignment, etc.) applies equally the second set of openings 50. However, for reasons which will be discussed later, it is preferred if the openings 50 in The second set are generally larger in size than the openings in the list set 40.

The openings 50 in the second set are preferably provided in the flow sleeve 30 only at or near the areas where flow deficiencies are expected. Alternatively, the second set of openings 50 can extend about the entire periphery 42 of the flow sleeve 30, but relatively larger openings 50L, compared to the other openings 50 in the second set, can be provided in the expected low flow areas. For example, in one turbine engine, it has been determined that the airflow entering the head-end 12 is high on the radially outboard side. Thus, the second set can provide larger openings 50L in areas other than the radially outboard side of the flow sleeve 30.

In one embodiment, the combustor flow sleeve 30 can have both a first set of openings 40 and a second set of openings 50. In another embodiment, the flow sleeve 30 can provide just the second set of openings 50.

A flow sleeve 30 according to embodiments of the invention can be provided in the combustor in any of a variety of manners. For instance, the flow sleeve can be bolted to a portion of the combustor head-end 12, such as the casing 20. When in place, the flow sleeve 30 can extend cantilevered therefrom toward its axial upstream end 32. The flow sleeve 30 can surround a portion of the combustor liner 16. The flow sleeve can surround at least a portion of other components as well including, for example, the main nozzles 60 and the pilot nozzle 62. As noted earlier, a flow passage 22 can be defined between the flow sleeve 30 and the liner 16, which can provide a path for compressor air 26 to enter the combustor head-end 12 to ultimately be used in the combustion process. The flow passage 22 can be generally annular in conformation.

One manner of using the flow sleeve 30 according to embodiments of the invention will now be described. Compressed air 26 from the compressor section (not shown) can enter the combustor section 10 of the engine. A portion of the air 26 can enter the passage 22 formed between the flow sleeve 30 and the liner 16. Another portion of the air 26 can pass through the first set of openings 40. Air flowing through the first set of openings 40 can impinge on the liner so as to provide impingement cooling. The air can then flow toward the head-end 12 to be used in the combustion process.

Thus, the first set of openings 40 are provided for purposes of cooling the liner 16. As noted earlier, in some cases, only a small portion of the liner 16 that is surrounded by the flow sleeve 30 actually has heat loading that requires cooling. Thus, the first set of openings 40 can be positioned on the flow sleeve 30 so that the impingement cooling is focused on the area of heat loading. Such positioning can be determined based an understanding of the combustion events occurring within the liner 12. For example, the first set of openings 40 can be provided on the flow sleeve 30 so as to be radially superimposed along the axial length of the flow sleeve so as to substantially correspond with the end of the flame in the liner 16. The flame extends from the pilot nozzle 62. In general, it is expected that the first set of openings 40 will be provided in a region defined between the axial upstream end and an axially central portion of the flow sleeve. In one embodiment, the first set of openings 40 can be provided from about 3 inches to about 4 inches from the upstream end 32 of the flow sleeve 30. In one embodiment, it is expected that impingement cooling of this zone can account for a relatively small percentage, from about 10 percent to about 20 percent, of the total amount of air 26 entering the flow sleeve 30. These percentages can apply even when the inlet 22*i* of the passage 22 is substantially restricted, as will be discussed below. By directing the air 26 to the specific areas in need of cooling, the system pressure drop experienced in the past can be reduced.

Figure 3:
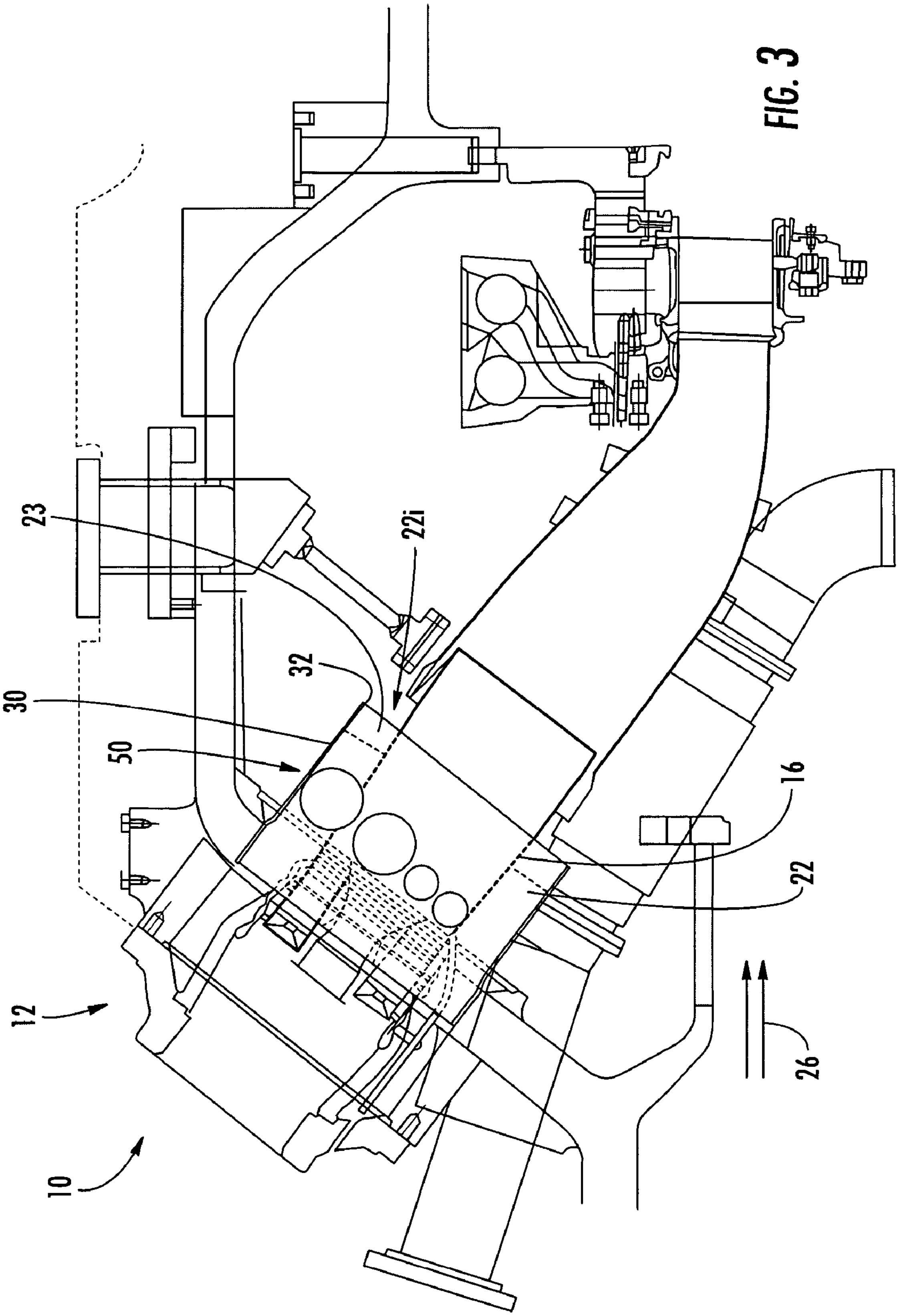
FIG. 3 is a partial cross-sectional view of a portion of a combustor section of a turbine engine having a first flow sleeve according to embodiments of the invention, showing the annular passage between the flow sleeve and the liner being substantially restricted at the passage inlet.

It should be noted that, in some circumstances, the full effect of the impingement cooling may not be fully realized due to the cross-flow between the air flowing into the openings 40 and the air 26 that enters the passage 22 through the upstream end 32 of the flow sleeve 30. Such cross-flow can diminish the effectiveness of the impingement cooling of the liner 16. One manner of reducing such a problem is to seal the end of the flow sleeve such that air 26 cannot enter the passage 22 through the upstream end 32 of the flow sleeve 30 or otherwise upstream of the openings 40. In one embodiment, entry of air into the passage 22 through the passage inlet 22*i* can be substantially restricted by providing a plate 23 at or near the passage inlet 22*i*, as shown in FIG. 3. Other ways of substantially restricting airflow into the passage 22 include placing sealing material between the outer peripheral surface of the liner 16 and the inner peripheral surface of the flow sleeve 30 near the axial upstream end 32. In addition, air flow into the passage 22 can be substantially restricted by one or more piston rings, sprung cloth seals or conventional spring seals. As a result, the cross-flow can be effectively reduced to zero, allowing for more effective impingement cooling of the liner 16.

Aside from the first set of openings 40 and inlet 22*i* to the passage 22 at the upstream end 32 of the flow sleeve 30, a portion of the air 26 entering the combustor section 10 can flow through the second set of openings 50. In one embodiment, the flow into the annular passage 22 through the second set of openings 50 can account for about 80 to about 90 percent of the overall flow entering the flow sleeve 30; these percentages can apply when the inlet 22*i* of the passage 22 is substantially restricted and/or when the inlet 22*i* of the flow passage 22 is otherwise unobstructed. This portion of the air 26 will not have traveled along the passage 22 between the liner 16 and flow sleeve 30 upstream of the openings 50, thereby retaining energy and diminishing the system pressure drop experienced with prior flow sleeves.

The second set of openings 50 can provide additional benefits. As noted earlier, it has been discovered that the use of prior flow sleeves 16 result in an uneven distribution of the air flowing into the combustor head-end 12. The second set of openings 50 can be used to make reduce the variations in the air flow, distribution into the combustor head-end 12. For instance, the openings 50 in the second set can be sized to correct the flow imbalances. That is, the second set of openings 50 can bias the flow into the head-end 12 by providing larger openings 50L in the areas where low flow is expected.

A flow sleeve 30 according to embodiments of the invention can provide advantages over prior flow sleeves. In short, the flow sleeve 30 can provide adequate cooling to the particular areas in need and can evenly distribute the airflow entering the combustor head-end 12. Such features can reduce the system pressure drop and increase engine power and performance.

The foregoing description is provided in the context of one possible flow sleeve configuration. Of course, aspects of the invention can be employed with respect to myriad combustors and flow sleeves, including all of those described above, as one skilled in the art would appreciate. Thus, it will of course be understood that the invention is not limited to the specific details described herein, which are given by way of example only, and that various modifications and alterations are possible within the scope of the invention as defined in the following claims.

What is claimed is:

1. A combustor for a turbine engine comprising:

a combustor head-end;

a liner extending from the head-end;

a flow sleeve having an axial upstream end and an axial downstream end, the downstream end of the flow sleeve being secured to the combustor head-end, at least a portion of the liner extending into the flow sleeve, wherein a substantially annular flow passage to the head-end is defined therebetween, the flow passage having an axial inlet formed between the axial upstream end of the flow sleeve and the liner;

wherein the flow sleeve includes a plurality of openings distributed about the flow sleeve in a region defined between the axial downstream end and an axially central location of the flow sleeve, the openings permitting fluid communication between the exterior of the flow sleeve and the flow passage, whereby an uneven distribution of the flow into the head-end through the passage is made substantially uniform.

2. The combustor of claim 1 wherein the plurality of openings are located in an axially central region of the flow sleeve.

3. The combustor of claim 1 wherein each of the plurality of openings is substantially circular.

4. The combustor of claim 1 wherein at least one of the plurality of openings is substantially non-circular.

5. The combustor of claim 1 wherein at least one of the plurality of openings is larger than the other openings.

6. The combustor of claim 1 wherein the plurality of openings are substantially identical.

7. The combustor of claim 1 wherein the plurality of openings are arranged in at least one row about the periphery of the flow sleeve.

8. A combustor for a turbine engine comprising:

a combustor head-end;

a liner extending from the head-end; and a flow sleeve having an axial upstream end and an axial downstream end, the downstream end of the flow sleeve being secured to the combustor head-end, at least a portion of the liner extending into the flow sleeve, wherein a substantially annular flow passage to the head-end is defined therebetween, the flow passage having an axial inlet formed between the axial upstream end of the flow sleeve and the liner;

wherein the flow sleeve includes a first plurality of openings distributed about the flow sleeve in a region defined between the axial upstream end and an axially central location of the flow sleeve, the first plurality of openings permitting fluid communication between the exterior of the flow sleeve and the flow passage, whereby air flowing through the first plurality of openings provides impingement cooling to those portions of the liner directly beneath the first plurality of openings, wherein the flow sleeve includes a second plurality of openings distributed about the flow sleeve in a region defined between the axial downstream end and an axially central location of the flow sleeve, the second plurality of openings permitting fluid communication between the exterior of the flow sleeve and the flow passage, whereby an uneven distribution of the flow into the head-end through the passage is made substantially uniform.

9. The combustor of claim 8 wherein the second plurality of openings are located in an axially central region of the flow sleeve.

10. The combustor of claim 8 wherein each of the second plurality of openings is substantially circular.

11. The combustor of claim 8 wherein at least one of the openings in the second plurality of openings is substantially non-circular.

12. The combustor of claim 8 wherein at least one of the second plurality of openings is larger than the other openings.

13. The combustor of claim 8 wherein the second plurality of openings are substantially identical.

14. The combustor of claim 8 wherein the second plurality of openings are arranged in at least one row about the periphery of the flow sleeve.

15. The combustor of claim 8 wherein the flow passage is substantially sealed upstream of the first set of openings, whereby cross-flow between the air flowing into the first plurality of openings and the air that enters the passage through the upstream end of the flow sleeve is minimized.

16. The combustor of claim 15 wherein the flow passage is substantially sealed by one of a plate, sealing material, piston rings, sprung cloth seals and spring seals.

17. The combustor of claim 8 wherein each of the second plurality of openings is larger than each of the first plurality of openings.

18. The combustor of claim 8 wherein each of the first plurality of openings is substantially circular.

19. The combustor of claim 8 wherein the first plurality of openings are arranged in at least one row about the periphery of the flow sleeve.

20. The combustor of claim 8 wherein the head-end further includes a pilot nozzle and a flame extending therefrom, wherein the flame extends inside of the liner to a flame end, wherein the first plurality of openings are radially superimposed along the axial length of the flow sleeve so as to substantially correspond with the flame end.

21. A combustor for a turbine engine comprising:

a liner; and a flow sleeve having an axial upstream end and an axial downstream end, at least a portion of the liner extending into the flow sleeve, wherein a substantially annular flow passage is defined therebetween, wherein the flow sleeve includes a first plurality of openings distributed about the flow sleeve in a region defined between the axial upstream end and an axially central location of the flow sleeve, the first plurality of openings permitting fluid communication between the exterior of the flow sleeve and the flow passage, whereby air flowing through the first plurality of openings provides impingement cooling to those portions of the liner directly beneath the first plurality of openings, wherein the flow sleeve includes a second plurality of openings distributed about the flow sleeve in a region defined between the axial downstream end and an axially central location of the flow sleeve, the second plurality of openings permitting fluid communication between the exterior of the flow sleeve and the flow passage, at least one opening of the second plurality of openings being larger than each opening in the first plurality of openings.

* * * * *